United States Patent [19]

Masse

[11] Patent Number: 5,103,740
[45] Date of Patent: Apr. 14, 1992

[54] VEHICLE FOR ROAD AND RAIL OPERATION WITH AIR SUSPENSION FOR ADJUSTING WEIGHT ON BOTH THE ROAD WHEELS AND RAIL WHEELS

[76] Inventor: Kenneth J. Masse, R.R. 6, Edmonton, Alberta, Canada, T5B 4K3

[21] Appl. No.: 486,449

[22] Filed: Feb. 28, 1990

[51] Int. Cl.⁵ ............................................. B61C 11/00
[52] U.S. Cl. .................................... 105/72.2; 105/82
[58] Field of Search ............... 105/72.2, 75, 82, 215.1, 105/215.2

[56] References Cited

U.S. PATENT DOCUMENTS

| | | | |
|---|---|---|---|
| 1,908,437 | 5/1933 | Nelson | 105/72.2 |
| 1,937,532 | 12/1933 | Ronk | 105/72.2 |
| 2,128,072 | 8/1938 | Brecht | 105/75 |
| 3,019,742 | 2/1962 | Kershaw | 105/72.2 |
| 3,286,654 | 8/1963 | Fisher | 105/177 |
| 3,286,657 | 11/1966 | Browne | 105/215.2 |
| 3,342,141 | 9/1967 | Browne | 105/215.2 |
| 3,875,870 | 4/1975 | Beatty | 105/215.2 |
| 4,364,315 | 12/1982 | Beatty | 105/215.2 |
| 4,397,243 | 8/1983 | Hickman | 105/159 |
| 4,448,132 | 5/1984 | Beatty | 105/215.2 |
| 4,527,486 | 7/1985 | Baird et al. | 105/215.2 |
| 4,917,020 | 4/1990 | Wicks et al. | 105/72.2 X |
| 4,922,830 | 5/1990 | Fujita et al. | 104/290 |
| 5,016,544 | 5/1991 | Woollam | 105/215.2 |

FOREIGN PATENT DOCUMENTS

| | | |
|---|---|---|
| 1043632 | 12/1978 | Canada . |
| 1054445 | 5/1979 | Canada . |
| 1122852 | 5/1982 | Canada . |
| 1153249 | 9/1983 | Canada . |
| 1170502 | 7/1984 | Canada . |

Primary Examiner—Robert J. Oberleitner
Assistant Examiner—S. Joseph Morano
Attorney, Agent, or Firm—Bereskin & Parr

[57] ABSTRACT

A vehicle adapted for operating on roadway and railway includes a frame, a plurality of roadwheels and at least two pairs of retractable railwheels. The rear railwheels are mounted to the frame by means of an adjustable suspension arrangement which is adapted for moving the railwheels between a roadway configuration, in which the railwheels are retracted and support and drive for the vechicle is provided by the roadwheels, and a railway configuration in which the railwheels are extended and adapted to locate the vehicle on a railway. In the railway configuration, at least one pair of railwheels are adapted to be driven. In one embodiment, railwheels are provided adjacent rear roadwheels of the vehicle and are adapted to be driven when in the railway configuration. The suspension for the rear railways may be adjusted such that the proportion of the weight of the vehicle supported by the railwheels is varied. In a further embodiment, a front pair of railwheels are provided adjacent the front roadwheels and are provided with an independent drive.

32 Claims, 3 Drawing Sheets

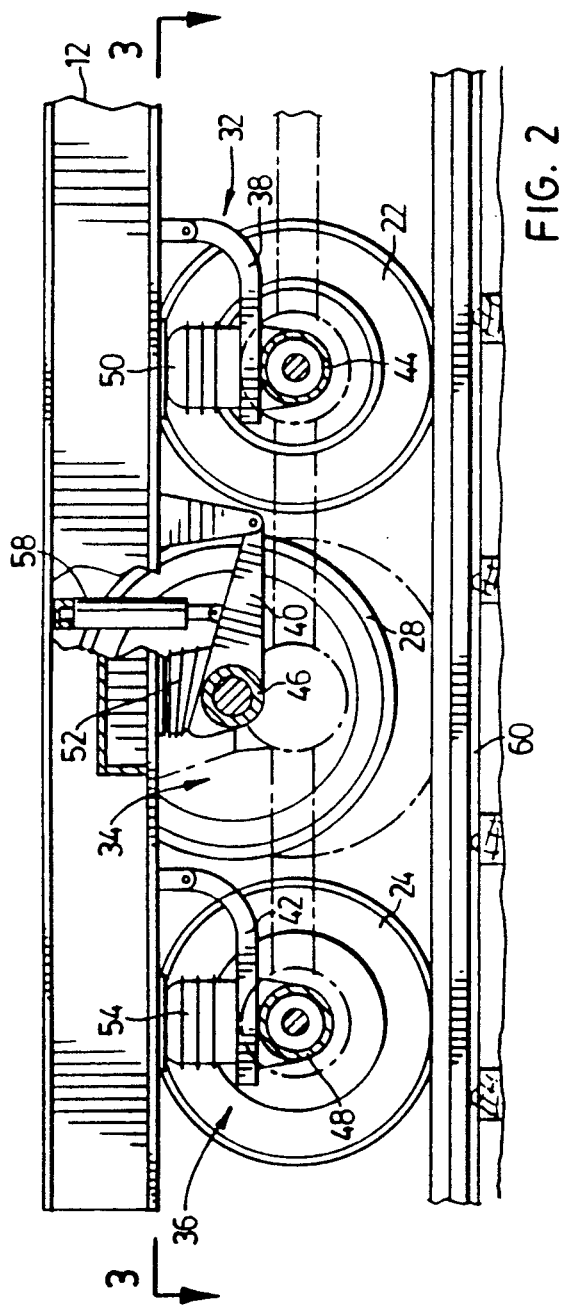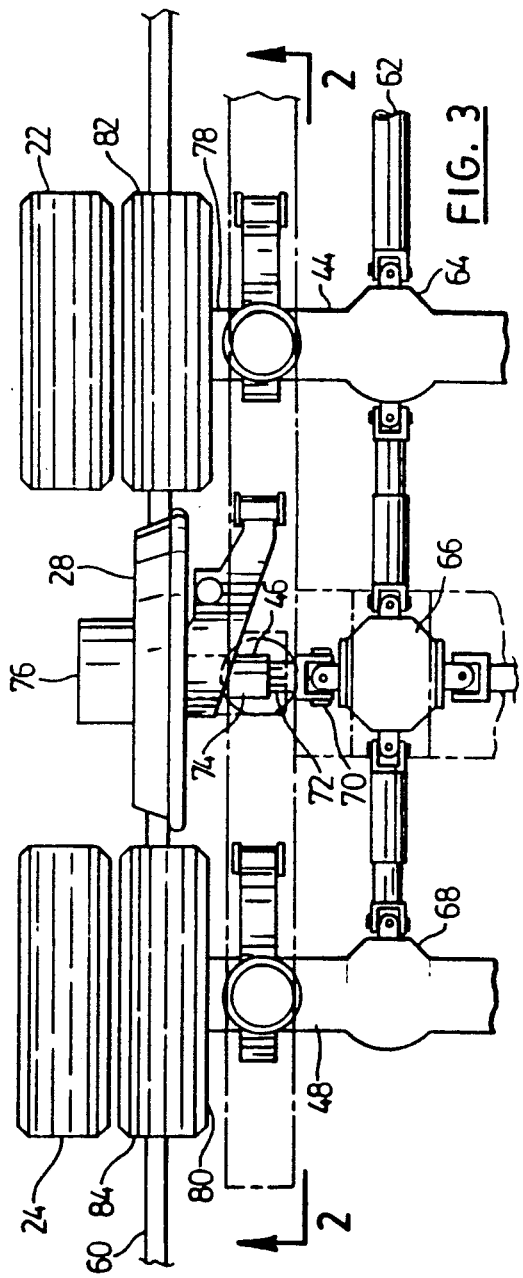

VEHICLE FOR ROAD AND RAIL OPERATION WITH AIR SUSPENSION FOR ADJUSTING WEIGHT ON BOTH THE ROAD WHEELS AND RAIL WHEELS

FIELD OF THE INVENTION

This invention relates to a vehicle adapted for operation on roadways and on rail tracks.

BACKGROUND OF THE INVENTION

For various reasons it is often desirable to provide vehicles capable of operation on conventional roadways and also on rail tracks. Such vehicles are used primarily in railway maintenance.

It is known to adapt conventional trucks and tractor trailers for use on rails, these vehicles being provided with retractable guidewheels which maintain the position of the vehicles on the railway tracks and which may be retracted for normal road use of the vehicle. To adapt a road truck for use on rails, a set of railwheels must be provided at the front of the truck, to act as guides and also to support the weight normally borne by the front wheels which are wider spaced than the gauge of conventional rail tracks. A rear set of railwheels must also be provided, but these wheels typically only support a small portion of the weight normally supported by the rear roadwheels; for the majority of conventional gauge railtracks and conventional trucks, the inner wheels of double sets of roadwheels rest on the rails, and are used to provide drive for the truck. Typically, a truck of this type will be provided with a crane boom and rail car couplings to allow a rail car to be pulled behind the truck.

In dry weather, such vehicles perform adequately and are capable of pulling one or more loaded rail cars, the rubber to steel contact between the driven rear tires and the rails providing sufficient traction and braking to allow the truck to tow the cars. However, in wet or icy conditions, the traction available decreases considerably and is often insufficient to allow the truck to tow and safely brake railway cars, or even for the truck itself to negotiate an incline.

SUMMARY OF THE INVENTION

The present invention provides a vehicle adapted for operation on roadway and railway including frame means, a plurality of roadwheels, and at least two pairs of retractable railwheels. The frame means provides mounting for the wheels, and the railwheels are adapted for movement between a roadway configuration in which the railwheels are retracted, and support and drive for the vehicle is obtained from the roadwheels, and a railway configuration in which the railwheels are extended and are adapted to locate the vehicle on a railway. In the railway configuration, at least one pair of railwheels are adapted to be driven directly and independently of the roadwheels to move the vehicle on a railway.

In one embodiment of the present invention, a pair of rear railwheels are provided adjacent rear roadwheels and are provided with adjustable suspension means which can be used to vary the proportion of the vehicle weight carried by the rear railwheels in the railway configuration. In dry conditions, the railwheels may act primarily as guide wheels, the majority of driving force and braking force for the vehicle being transmitted through the rubber tired roadwheels. In wet conditions, in which rubber gives poor traction on steel rails, the proportion of weight carried by the railwheels is increased such that a greater proportion of driving force and braking force are supplied through the cast iron railwheels.

In a further embodiment of the present invention, a pair of railwheels are provided adjacent the front roadwheels of the vehicle, and are adapted to support the front of the vehicle in the railway configuration. The front railwheels may be provided with an independent prime mover.

BRIEF DESCRIPTION OF THE DRAWINGS

Embodiments of the present invention will now be described, by way of example, with reference to the accompanying drawings, in which:

FIG. 2 is a simplified side view of the far side rear wheels of the vehicle of FIG. 1 in a roadway configuration, corresponding to a sectional view taken on line 2—2 of FIG. 3 below;

FIG. 3 is a plan view of the rear wheels and associated drive means of the far side rear wheels taken on line 3—3 of FIG. 2;

DETAILED DESCRIPTION OF PREFERRED EMBODIMENT

Figure 1:
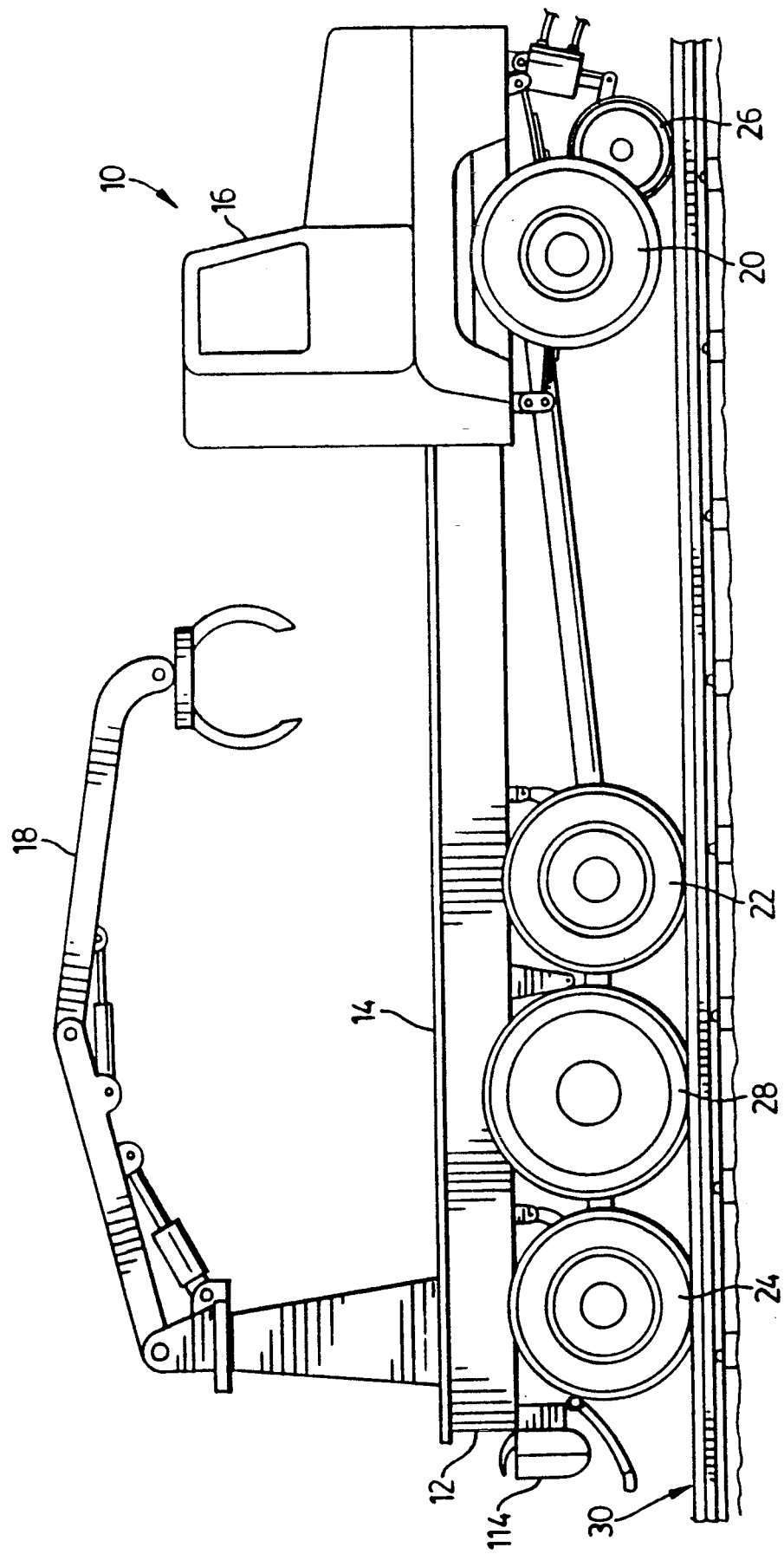
FIG. 1 is a side view of a vehicle in accordance with a preferred embodiment of the present invention.

Reference is first made to FIG. 1 of the drawings, which illustrates a vehicle or truck 10 in accordance with a preferred embodiment of the present invention. The truck 10 comprises a substantially conventional frame 12, cargo bed 14 and cab 16. In the particular example shown, a crane 18 is mounted to the rear of the cargo beds 14.

The truck 10 is provided with pairs of conventional front and rear roadwheels 20, 22 and 24 shod with pneumatic rubber tires and also with pairs of front and rear railwheels 26 and 28. The railwheels will typically be formed of cast iron. As will be described hereinbelow, the railwheels 26 and 28 are adapted for movement between a roadway configuration, in which the railwheels 26 and 28 are retracted, and support and drive for the truck 10 is obtained from the roadwheels 20, 22 and 24, and a railway configuration, as is shown in FIG. 1, in which the railwheels 26 and 28 are extended and adapted to located the vehicle on a railway 30.

The configuration of the rear wheels 22, 24 and 28 will be described first, with reference to FIGS. 2 and 3 of the drawings. As illustrated in somewhat simplified form in FIG. 2, the rear wheels are mounted on mutually independent suspension assemblies 32, 34 and 36. Each of the assemblies includes a trailing arm 38, 40 and 42 fixed to a respective axle 44, 46 and 48, and an air bag 50, 52 and 54 providing a resilient mounting between the free end of the arm and the frame 12.

FIG. 2 illustrates the rear railwheel 28 in solid outline in the roadway configuration, in which the railwheel is lifted clear of a road surface. The lifting is achieved by deflating the respective air bag 52 (shown deflated in solid outline) and retracting a hydraulic lifting cylinder 58 depending from the frame and pivotally connected to the trailing arm 40. To move the railwheel 28 to the railway configuration (as shown in ghost outline), the cylinder 58 is released and lets the railwheel drop into contact with a rail 60. The air bag 52 is inflated, the air pressure being adjusted to vary the proportion of vehicle weight that the railwheel 28 will carry. Where it is desired that each of the rear wheels 22, 24 and 28 will carry a similar weight, the air pressure in each of the air bags 50, 52 and 54 is equalized. If it is wished to increase the load that is carried by the rail wheel, the pressure in the respective air bag 52 is increased.

FIG. 3 of the drawings illustrates, in somewhat simlified form, the drive transfer from a central drive shaft 62, to respective differentials 64, 66 and 68 and the respective axles 44, 46, 48 such that the railwheels may be driven at the same speed as, but independently of the roadwheels from the truck engine. To accommodate the movement of the railwheel 28 between the railway and roadway configurations, the rail axle 48 is linked to the differential through a universal joint 70 and the axle 46 is formed of two splined, sliding parts 72, 74. To withstand the shocks transmitted through the solid railwheel 28 a planetary reduction gear assembly 76 is provided between the axle 46 and the wheel 28. In this example, similar assemblies 78 and 80 are provided between the roadwheels 22 and 24 and the respective axles 44 and 48. Suitable planetary reduction gear assemblies are supplied by M.A.N. of the Federal Republic of Germany.

In the roadway configuration, drive to the railwheels is of course disconnected.

As can be seen in FIG. 3, the railwheel 28 is located such that it will engauge the rail 60 and thus maintain the position of the rear of the truck relative to the rails. For conventional North American gauge railways and trucks the inner ones of the double set of roadwheels 22 and 24 are of similar spacing to the rails, such that the tires of the inner wheels 82 and 84 rest on the rails.

In dry conditions, the traction between a rubber tire and a steel rail is generally better than between a cast iron or steel tired railwheel and a steel rail. Accordingly, on dry rails the majority of the weight of the rear of the truck 10 will be carried by the roadwheels 22 and 24 which will also provide the major proportion of the drive and braking at the rear of the vehicle. In wet or icy conditions, the situation is reversed, that is the traction between a cast iron railwheel and a steel rail is generally better than between a rubber tire and a steel rail, such that in these conditions the pressure in the air bag 52 is increased and the proportion of driving and braking traction provided by the railwheel 28 increased.

Figure 4:
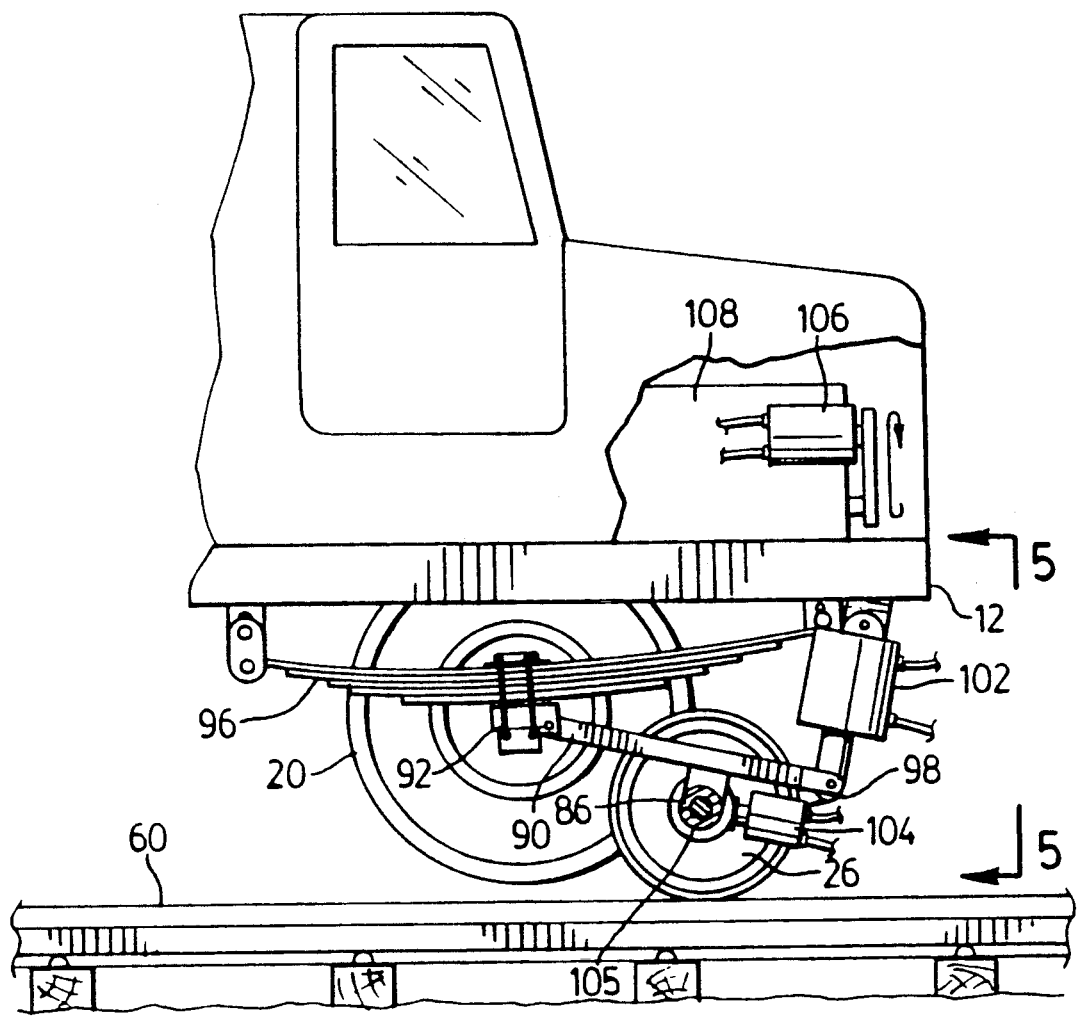
FIG. 4 is an enlarged scrap view of the front of the vehicle and the far side front wheels and associated suspension and drive of the vehicle of FIG. 1 corresponding to a sectional view on line 4—4 of FIG. 5 below.
Figure 5:
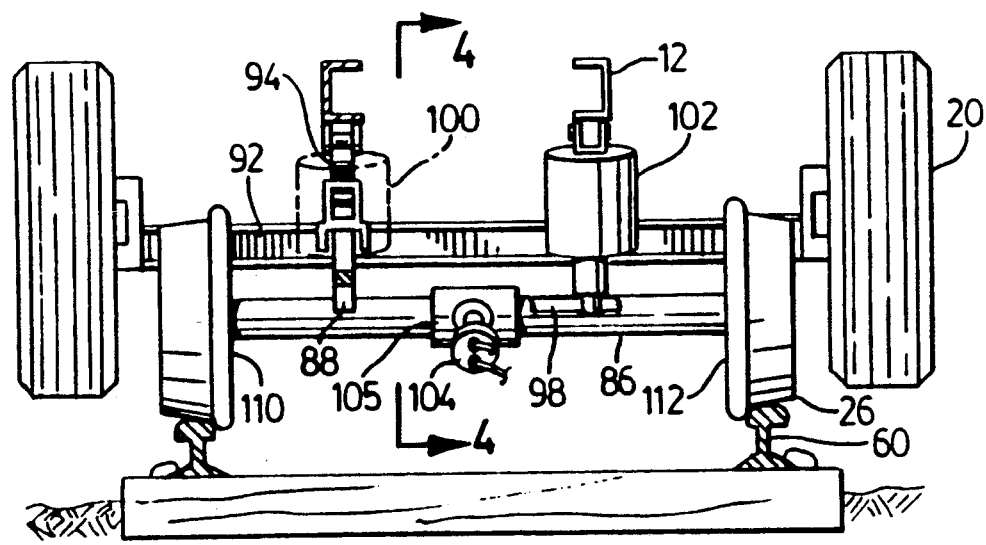
FIG. 5 is a front view of the front wheels and associated suspension and drive of the vehicle of taken on line 5—5 of FIG. 4.

Reference is now made to FIGS. 4 and 5 of the drawings, which illustrate details of the front roadwheels 20 and railwheels 26. Both drawings illustrate the railwheel 26 in the railway configuration, with the railwheels resting on rails 60. It will be noted from FIG. 5 that the front roadwheels 20 are spaced wider apart than the conventional gauge rails.

The railwheels 26 are mounted on a common axle 86 which extends between two suspension arms 88 and 90. In this example, the front roadwheels 20 are mounted on an axle 92 which is supported by leaf springs 94, and the trailing end of each arm 88 and 90 is mounted to a respective leaf spring 94 and 96. The leading end of each arm 88 and 90 is mounted on a cross bar 98 which is linked to the truck frame 12 by two hydraulic lifting cylinders 100 and 102. The cross bar 98 also serves as mounting for a hydraulic motor 104 which drives the railwheels through a common differential 105. The motor 104 is driven from a hydraulic pump 106, itself driven by the truck prime mover in the form of an internal combustion engine 108. As with the rear wheels, the front railwheels 26 are driven through respective planetary reduction gear assemblies 110 and 112 which are capable of withstanding the shocks transmitted from the rail 60 through the cast iron railwheels.

In the railway configuration, the front railwheels 26 support the entire weight of the front end of the truck providing tractive power, and guide and braking functions; the front railwheels provide excellent tractive force and greatly increase the pulling power of the truck 10.

Referring once more to FIG. 1 of the drawings, the illustrated truck 10 is shown provided with a crane 18 and also a railcar coupling 114. This vehicle would typically be used for track maintenance and be capable of pulling a number of cars while in the railway configuration.

The ability of the vehicle to travel on both roadway and railway allows the vehicle to move between sites which are not necessarily easily or conveniently linked by railway and permits the use of a single vehicle to, for example, transport supplies from a source which is remote from a railway to a site only accessible by railway, without necessitating transfer of the supplies from one vehicle to another.

A vehicle adapted in this manner also has utility in use as a snow clearing vehicle, particularly for use in clearing "dead end" tracks or branch lines where the vehicle can travel along the railway to one end and then leave the railway by some suitable roadway, rather than having to retrace the original route which may add considerable travel time to the snow clearing operation and which may also interfere with other rail traffic.

Thus, it will be seen that a vehicle according to the present invention provides a vehicle which can be conveniently adapted for travel on road or rail, and which in the railway configuration provides considerable tractive power in a range of rail conditions.

It will be clear to those skilled in the art that the above description is merely exemplary, and that various modifications and improvements may be made to the invention without departing from the scope of the invention.

I claim:

1. A vehicle adapted for operation on roadway and railway including:
   a) frame means;
   b) first and second pairs of roadwheels mounted on the frame means;
   c) first and second pairs of retractable railwheels mounted on the frame means for movement between a roadway configuration in which the railwheels are retracted and support and drive for the vehicle is provided by the roadwheels and a railwheel configuration in which the railwheels are extended and adapted to locate the vehicle on a railway;
   d) adjustable, independent air suspension between the frame means and each wheel of the first pairs of roadwheels and railwheels, the air pressure being adjustable to vary the proportion of vehicle weight carried by each of said first pairs of wheels with the railwheels in the railway configuration; and e) first drive means for driving the first pair of road wheels in the roadway configuration, and for driving the first pair of railwheels and the first pair of roadwheels in the railway configuration.

2. The vehicle of claim 1, wherein the first pairs of wheels are the rear wheels of the vehicle.

3. The vehicle of claim 2, and further including lift means to move the rear railwheels between the roadway and railway configurations.

4. The vehicle of claim 2, wherein each railwheel of the pair of rear railwheels is provided with independent air bag suspension and lift means, to move the rear railwheels from the railway configuration to the roadway configuration, the air bag pressure being released and the lift means actuated to lift the rear railwheels from the railway configuration.

5. The vehicle of claim 4, wherein at least the pair of rear railwheels are mounted on a trailing arm pivotally mounted to the frame means.

6. The vehicle of claim 5, wherein a respective differential is provided to transfer drive from a drive shaft from a vehicle prime mover to drive axles for each of the rear wheels and at least each rear railwheel drive axle includes a planetary drive axle.

7. The vehicle of claim 6, wherein each said drive axle for driving a railwheel includes a length adjustable drive shaft to accomodate movement of the respective railwheel between the railway and roadway configurations.

8. The vehicle of claim 7, wherein the vehicle is provided with an additional pair of rear roadwheels and the pair of rear railwheels are provided between said first and additional pairs of rear roadwheels.

9. The vehicle of claim 2, wherein said second pairs of wheels are located towards the front of the vehicle, in the railway configuration the front railwheels supporting the weight of the vehicle which is supported by the front roadwheels in the roadway configuration.

10. The vehicle of claim 9, wherein, in the railway configuration, the front railwheels are driven by common second drive means through a common differential.

11. The vehicle of claim 10, wherein the second drive means is in the form of a hydraulic motor driven by fluid supplied from a hydraulic pump driven by a prime mover used for driving the vehicle in the roadway configuration.

12. The vehicle of claim 10, wherein the the first and second pairs of railwheels are driven via planetary drive axles.

13. The vehicle of claim 10, wherein the front railwheels are provided on a common support member extending across the vehicle and mounted on a pair of arms, one end of each of the arms being pivotally mounted to the frame means, and lift means extending between the arms and the frame means for moving the front railwheels between the roadway and railway configurations.

14. The vehicle of claim 13, wherein the lift means is in the form of a pair of hydraulic lift cylinders, each cylinder extending between the frame means and the other end of the respective arm.

15. The vehicle of claim 14, wherein the front roadwheels and said one end of each of the arms, are mounted to the frame means via common suspension means.

16. A vehicle adapted for operation on roadway and railway including:

a) frame means;

b) rear and front pairs of roadwheels mounted on the frame means;

c) rear and front pairs of retractable railwheels mounted on the frame means for movement between a roadway configuration in which the railwheels are retracted and support and drive for the vehicle is provided by the roadwheels, and a railway configuration in which the railwheels are extended and adapted to locate the vehicle on a railway;

d) adjustable, independent air suspension between the frame means and each wheel of the rear pairs of roadwheels and railwheels, the air pressure being adjustable to vary the proportion of the vehicle weight carried by each of said rear pairs of wheels with the railwheels in the railway configuration;

e) first drive means for driving the first pair of road wheels in the roadway configuration, and for driving the first pair of railwheels and the first pair of roadwheels in the railway configuration; and f) a respective differential for transferring drive from a drive shaft from a vehicle prime mover to drive axles for each of the rear wheels, and at least each rear rearwheel driven axle includes a planetary drive axle, said drive axle including a length adjustable drive shaft to accommodate movement of the respective railwheel between the railway and roadway configurations;

wherein at least the pair of rear railwheels are mounted on a trailing arm pivotally mounted to the frame means, and each railwheel of the pair of rear railwheels is provided with independent air bag suspension and lift means to move the rear railwheels from the railway configuration to the roadway configuration.

17. The vehicle of claim 16, wherein the vehicle is provided with an additional pair of rear roadwheels and the pair of rear railwheels are provided between said first and additional pairs of rear roadwheels.

18. A vehicle adapted for operation on roadway and railway including:

a) frame means;

b) rear and front pairs of roadwheels mounted on frame means, said front roadwheels provided towards the front of the vehicle;

c) rear and front pairs of retractable railwheels mounted on the frame means for movement between a roadway configuration in which the railwheels are retracted and support and drive for the vehicle is provided by the roadwheels, and a railway configuration in which the railwheels are extended and adapted to locate the vehicle on a railway;

d) adjustable, independent air suspension between the frame means and each wheel of the rear pairs of roadwheels and railwheels, the air pressure being adjustable to vary the proportion of vehicle weight carried by each of said rear pairs of wheels with the railwheels in the railway configuration;

e) first drive means for driving the first pair of road wheels in the roadway configuration, and for driving the first pair of railwheels and the first pair of roadwheels in the railway configuration;

f) in the railway configuration, the front railwheels supporting the weight of the vehicle which is supported by the front roadwheels in the roadway configuration;

g) in the railway configuration, the front railwheels being driven by common second drive means through a common differential; and h) the front railwheels being provided on a common support member extending across the vehicle and mounted on a pair of arms, one end of each of the arms being pivotally mounted to the frame means, and lift means extending between the arms and the frame means for moving the front railwheels between the roadway and railway configurations, the lift means being in the form of a pair of hydraulic lift cylinders, each cylinder extending between the frame means and the other end of the respective arm, and wherein the front roadwheels and said one end of each of the arms are mounted to the frame means via common suspension means.

19. The vehicle of claim 18, wherein the second drive means is in the form of a hydraulic motor driven by fluid supplied from a hydraulic pump driven by a prime mover used for driving the vehicle in the roadway configuration.

20. The vehicle of claim 18, wherein the rear and front pairs of railwheels are driven via planetary drive axles.

21. A vehicle adapted for operation on roadway and railway including:

a) frame means;
b) first and second pairs of roadwheels mounted on the frame means;
c) first and second pairs of retractable railwheels mounted on the frame means for movement between a roadway configuration in which the railwheels are retracted and support and drive for the vehicle is provided by the roadwheels and a railway configuration in which the railwheels are extended and adapted to locate the vehicle on a railway;
d) adjustable, independent air suspension between the frame means and each wheel of the first pairs of roadwheels and railwheels, the air pressure being adjustable to vary the proportion of vehicle weight carried by each of said first pairs of wheels with the railwheels in the railway configuration;
e) first drive means for driving the first pair of road wheels in the roadway configuration, and for driving the first pair of railwheels and the first pair of roadwheels in the railway configuration; and
f) a respective differential for transferring drive from a drive shaft from a vehicle prime mover to drive axles for each of the first wheels and at least each first railwheel drive axle includes a planetary drive axle, said drive including a length adjustable drive shaft to accommodate movement of the respective railwheel between the railway and roadway configurations.

22. The vehicle of claim 21, wherein the first pairs of wheels are the rear wheels of the vehicle.

23. The vehicle of claim 22, wherein each railwheel of the pair of rear railwheels is provided with independent air bag suspension and lift means, to move the rear railwheels from the railway configuration to the roadway configuration, the air bag pressure being released and the lift means actuated to lift the rear railwheels from the railway configuration.

24. The vehicle of claim 23, wherein at least the pair of rear railwheels are mounted on a trailing arm pivotally mounted to the frame means.

25. The vehicle of claim 24, wherein the vehicle is provided with an additional pair of rear roadwheels and the pair of rear railwheels are provided between said first and additional pairs of rear roadwheels.

26. A vehicle adapted for operation on roadway and railway including:

a) frame means;
b) first and second pairs of roadwheels mounted on the frame means;
c) first and second pairs of retractable railwheels mounted on the frame means for movement between a roadway configuration in which the railwheels are retracted and support and drive for the vehicle is provided by the roadwheels and a railway configuration in which the railwheels are extended and adapted to locate the vehicle on a railway;
d) adjustable, independent air suspension between the frame means and each wheel of the first pairs of roadwheels and railwheels, the air pressure being adjustable to vary the proportion of vehicle weight carried by each of said first pairs of wheels with the railwheels in the railway configuration;
e) first drive means for driving the first pair of road wheels in the roadway configuration, and for driving the first pair of railwheels and the first pair of roadwheels in the railway configuration; and
f) the second railwheels being provided on a common support member extending across the vehicle and mounted on a pair of arms, one end of each of the arms being pivotally mounted to the frame means, and lift means extending between the arms and the frame means for moving the second railwheels between the roadway and railway configurations, and wherein the second roadwheels and said one end of each of the arms are mounted to the frame means via common suspension means.

27. The vehicle of claim 26, wherein the first pairs of wheels are the rear wheels of the vehicle.

28. The vehicle of claim 27, wherein said second pairs of wheels are located towards the front of the vehicle, in the railway configuration the front railwheels supporting the weight of the vehicle which is supported by the front roadwheels in the roadway configuration.

29. The vehicle of claim 28, wherein, in the railway configuration, the front railwheels are driven by common second drive means through a common differential.

30. The vehicle of claim 29, wherein the second drive means is in the form of a hydraulic motor driven by fluid supplied from a hydraulic pump driven by a prime mover used for driving the vehicle in the roadway configuration.

31. The vehicle of claim 29, where the first and second pairs of railwheels are driven via planetary drive axles.

32. The vehicle of claim 26, wherein the lift means is in the form of a pair of hydraulic lift cylinders, each cylinder extending between the frame means and the other end of the respective arm.

* * * * *